(12) United States Patent
Friedland

(10) Patent No.: US 8,210,131 B2
(45) Date of Patent: Jul. 3, 2012

(54) CANINE COAT WITH INCORPORATED HARNESS

(75) Inventor: Michael Friedland, Brooklyn, NY (US)

(73) Assignee: Pawz Dog Boots, LLC, Brooklyn, NY (US)

( * ) Notice: Subject to any disclaimer, the term of this patent is extended or adjusted under 35 U.S.C. 154(b) by 0 days.

(21) Appl. No.: 12/813,263

(22) Filed: Jun. 10, 2010

(65) Prior Publication Data

US 2010/0313825 A1    Dec. 16, 2010

Related U.S. Application Data

(60) Provisional application No. 61/268,359, filed on Jun. 11, 2009.

(51) Int. Cl.
*A01K 13/00* (2006.01)

(52) U.S. Cl. .......................... 119/850; 119/792

(58) Field of Classification Search .................. 119/850, 119/792, 793, 857
See application file for complete search history.

(56) References Cited

U.S. PATENT DOCUMENTS

| | | | | |
|---|---|---|---|---|
| 4,715,618 A | * | 12/1987 | Harris | 119/771 |
| 5,247,905 A | | 9/1993 | Arakawa | |
| 5,894,817 A | * | 4/1999 | Manuel | 119/497 |
| 5,941,199 A | * | 8/1999 | Tamura | 119/850 |
| 5,996,537 A | * | 12/1999 | Caditz | 119/850 |
| 6,123,049 A | * | 9/2000 | Slater | 119/850 |
| 6,213,057 B1 | | 4/2001 | Franco et al. | |
| 6,443,101 B1 | | 9/2002 | Fazio | |
| 6,820,574 B2 | * | 11/2004 | Sharpe | 119/820 |
| 6,827,044 B2 | * | 12/2004 | Lobanoff et al. | 119/771 |
| D507,084 S | * | 7/2005 | Sabeh-Azar | D30/199 |
| 7,165,511 B1 | | 1/2007 | Brezinski | |
| 7,325,516 B2 | * | 2/2008 | Moore | 119/850 |
| 7,343,881 B2 | * | 3/2008 | Schantz et al. | 119/792 |
| 7,370,608 B1 | * | 5/2008 | Friedman | 119/850 |
| 2005/0072376 A1 | * | 4/2005 | Kerrigan | 119/850 |
| 2005/0229869 A1 | * | 10/2005 | Leo | 119/850 |
| 2005/0263102 A1 | * | 12/2005 | Sherman et al. | 119/792 |
| 2006/0090711 A1 | * | 5/2006 | Richards | 119/850 |
| 2006/0156997 A1 | * | 7/2006 | Moore | 119/792 |
| 2008/0223310 A1 | * | 9/2008 | Remick et al. | 119/792 |
| 2010/0199927 A1 | * | 8/2010 | Cigard et al. | 119/850 |

\* cited by examiner

*Primary Examiner* — Yvonne Abbott

(74) *Attorney, Agent, or Firm* — Davidson, Davidson & Kappel, LLC

(57) ABSTRACT

A protective garment for domesticated animals, such as canines, is provided which incorporates a built-in harness. The harness, which may be hidden from view, connects at the animal's back and has a leash connector for connecting a leash to the harness.

26 Claims, 10 Drawing Sheets

CANINE COAT WITH INCORPORATED HARNESS

FIELD OF THE INVENTION

This invention relates to a protective garment for domesticated animals, such as canines, and other domesticated animals, which incorporates a built-in harness, which may be hidden from view.

BACKGROUND

This invention pertains to a protective garment for domesticated animals. Being primarily used by canines, the present invention describes a coat or garment for animals, and particularly to a coat which has a built-in harness. In certain embodiments, the harness may be hidden from view.

Whether for warmth or for fashion, many animal owners are dressing their pet in a coat or garment. A typical coat consists of some variation of a cover for the back and sides with a network of straps under the belly and across the chest to keep the coat in place. Some are more like sweaters and slip on over the dogs head.

Many dog owners are choosing a harness over a collar for controlling their dog on a leash. The problem for harness users who also need to protect their dog from the environment is that the harness has to be applied over the coat or the coat needs to be modified to fit over the harness. The coats currently available inhibit the use of a harness in conjunction with the coat.

The present invention has the advantage of combining a harness and a protective dog garment. There are a number of harnesses that are currently known in the art:

U.S. Pat. No. 7,343,881 B2, to Schantz et al., (Mar. 18, 2008) discloses an animal harness and seat belt attachment. The harness disclosed in U.S. Pat. No. 7,343,881 B2 is not a garment and provides no weather protection at all.

U.S. Pat. No. 7,165,511 B1, to Brezinski, (Jan. 23, 2007) discloses a harness. The harness disclosed in U.S. Pat. No. 7,165,511 B1 is not a garment and provides no weather protection at all.

U.S. Pat. No. 6,443,101 B1, to Fazio, (Sep. 3, 2002) is described as pet apparel with an attached leash. It attaches with hood and loop which would not be the safest way to secure your pet. The current art does not involve a leash and does not require any fasteners.

U.S. Pat. No. 6,213,057 B1, to Franco et al., (Apr. 10, 2001) discloses a harness. The harness disclosed in U.S. Pat. No. 6,213,057 B1 is not a garment and provides no weather protection at all.

U.S. Pat. No. 6,247,905, to Arakawa, (Sep. 28, 1993) discloses a harness. U.S. Pat. No. 6,247,905 does not disclose a garment and provides no weather protection at all.

U.S. Patent Application Publication No: US 2006/0090711, to Richards, Pub. Date: May 4, 2006 entitled "Animal Coat Harness", describes an animal 'cover.' The animal 'cover' disclosed in US 2006/0090711 appears to be a small blanket with straps that clip across the chest and under the dog. In the present invention, the harness is hidden in the design, is far more protective in its coverage, and does not require straps or clips.

In addition to the aforementioned prior art, there is prior art for harnesses that assist dogs with disabilities, for capturing a dog's waste, for carrying a dog, and for tethering dogs but there are none that incorporate the security and effectiveness of the harness with the warmth of a protective garment all in one convenient and effective package as disclosed in the present invention. The present invention has the advantage of combining a harness and a protective dog garment.

SUMMARY

The current invention solves the problem of applying a coat over a harness by producing a full coverage protective garment that is also a harness. Built into the garment or coat of the present invention is a secure harness. In certain embodiments, the harness is channeled both across the dog's upper chest and behind the front legs with the ends meeting up at the top where it connects to a leash. The working of the harness is completely hidden from view.

The objective of the present invention is to provide a protective garment for pets with a built-in harness. The problem for a harness user is that dog coats are not designed to go over them and they are not designed to go over dog coats.

Keeping to that criterion, this invention solves the problem by incorporating into a comfortable and protective animal coat a secure harness. In certain embodiments, the harness is channeled both across the animal's upper chest and behind the front legs, with the harness ends meeting up at the top where it connects to a leash. Other embodiments can involve different configurations of the harness, for example in an X pattern. The harness may be a single strap or may involve the use of two or more straps. Certain embodiments include a garment made with textiles with warmth properties and/or with windproof features and/or light weight fabrics for use in warm weather.

DETAILED DESCRIPTION

The biggest problem for a dog owner that uses a harness is how to use it with a dog coat. A harness will not work under the coat because the coat doesn't have an opening for the leash hardware and it is awkward to wear the harness over the coat. In addition, the use of a harness with a dog goat would require two products to be purchased and worn at the same time instead of one convenient product that does the job of two.

Many harness users have their favorite coat altered to allow it to work in conjunction with the harness.

The consumer advantages of the current invention are ease of use, price, fit comfort and versatility. The workings of the harness can be hidden and there are no clips or loops typically involved in applying a harness. It goes on like a sweater.

Most consumers put their pet's coat on and take it off many times during the day. The convenience of a coat and harness together becomes apparent when used frequently. In addition, dogs usually don't like 'getting dressed'. The current invention is the simplest most elegant solution.

The coat may be produced in many styles and textiles and still incorporate the harness. The preferred embodiment is a pet garment comprised of a material that can provide comfort, expand enough to move with an animal and to fit the garment on the animal.

In certain embodiments, the material is elastic enough to stretch over the animal's head and front legs. In some embodiments, the textile could provide warmth, wind blocking properties and other features. The harness material can be made of any material strong enough to restrain a domesticated animal. The harness material can be a strong ribbon cable made of any durable material including, but not limited to, natural or man made materials such as nylon, cotton, hemp. The harness could be a cable made of a metal or even nylon like a fishing line. The harness material runs across the animal's lower chest above the front legs and another harness strap that runs under the animal behind the front legs and meeting together at the top on the animal's back behind the neck where there is a leash connector for attaching a leash. This leash connector may be any material strong enough to restrain a pet including, but not limited to, a metal ring, 'D' ring, a plastic ring or durable strap. The harness material in certain embodiments is a single strap and in other embodiments may comprise two or more straps.

Figure 1:
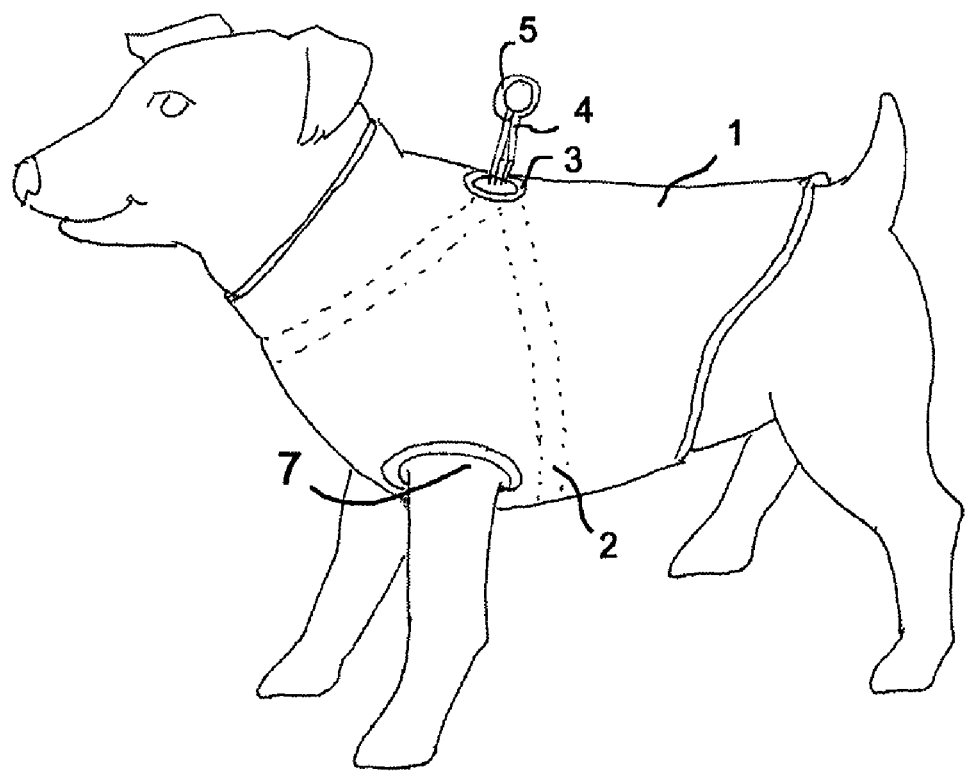
FIG. 1 represents the invention on a dog.
Figure 2:
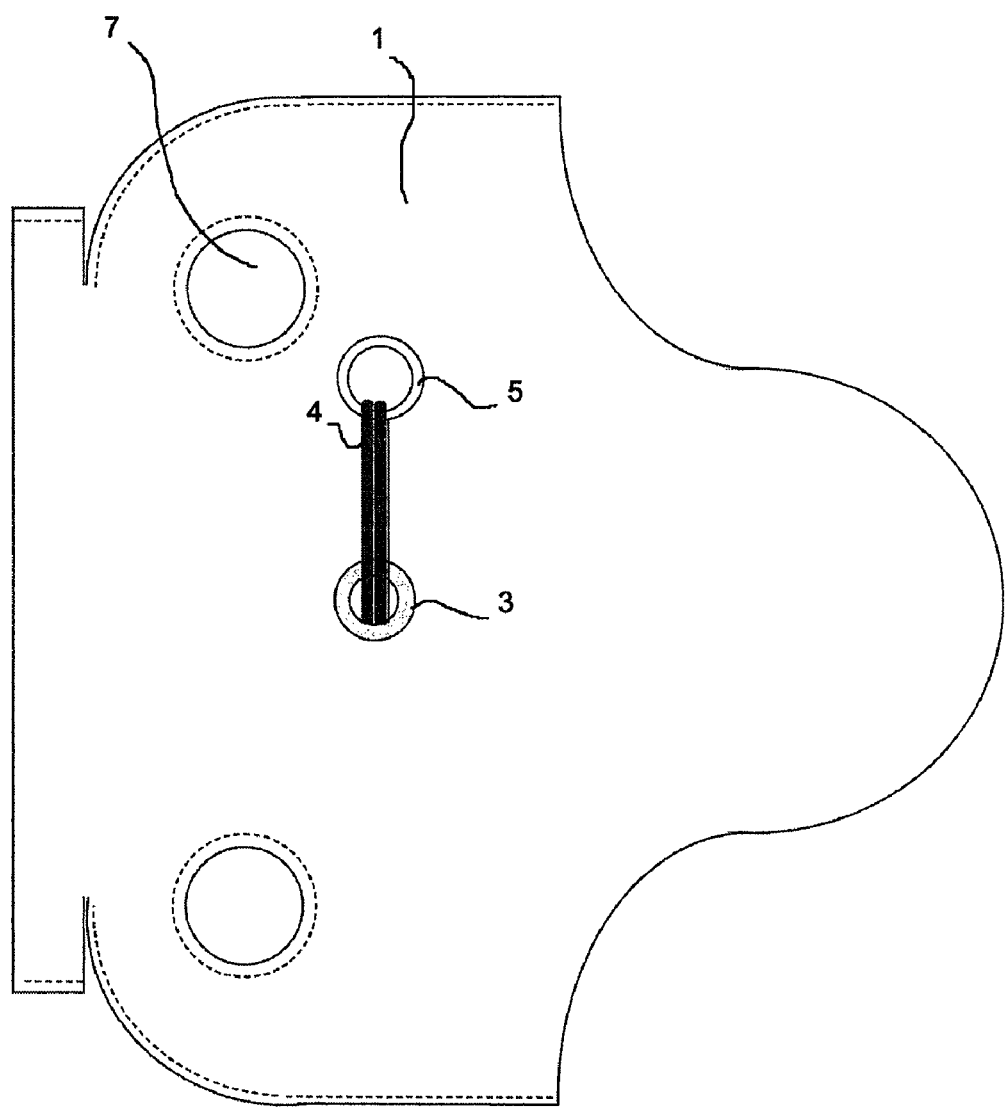
FIG. 2 is bird's-eye view of the invention if garment was not sewn together.
Figure 2A:
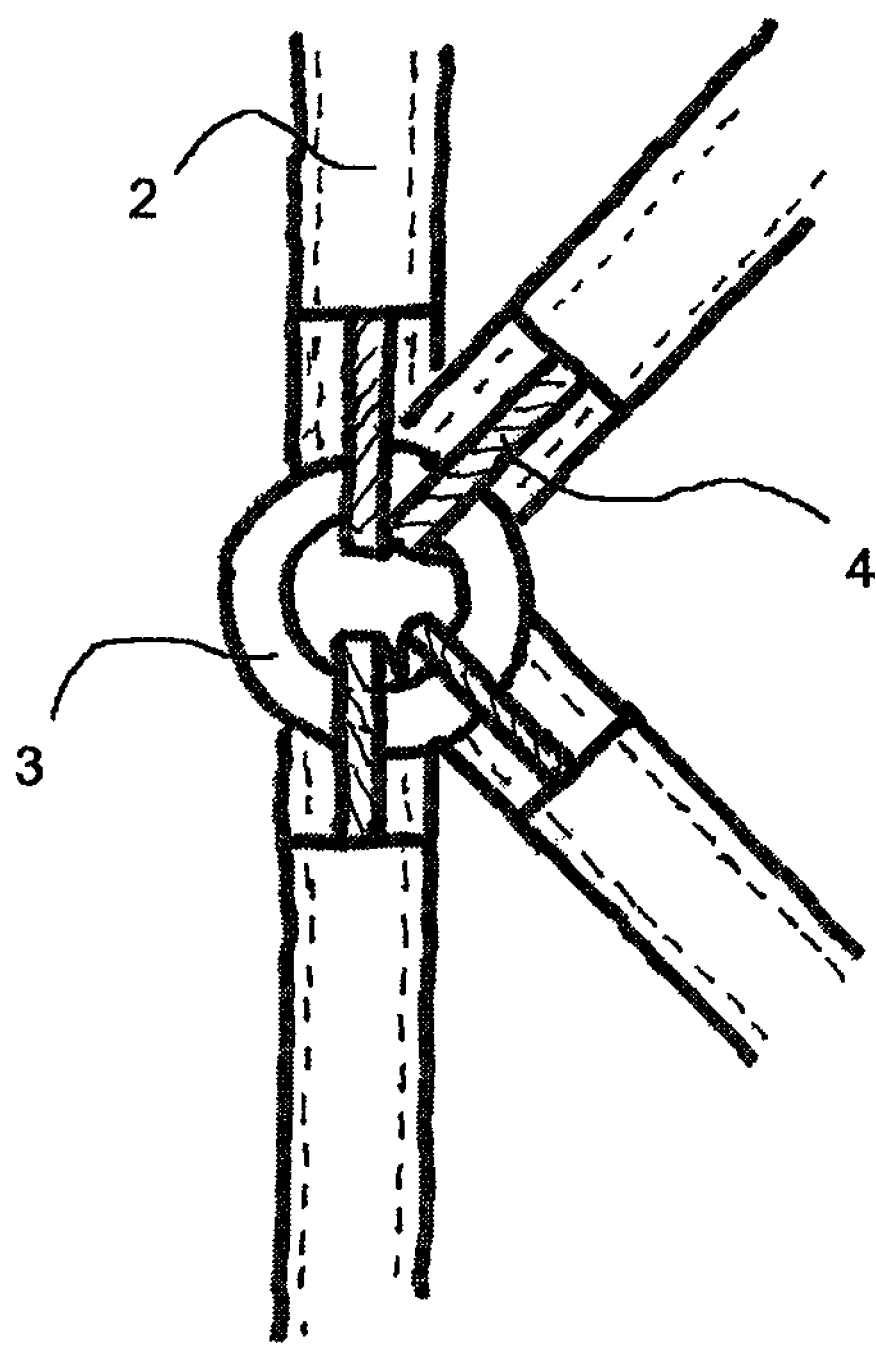
FIG. 2a is a close-up view of the harness assembly from the underside.
Figure 2B:
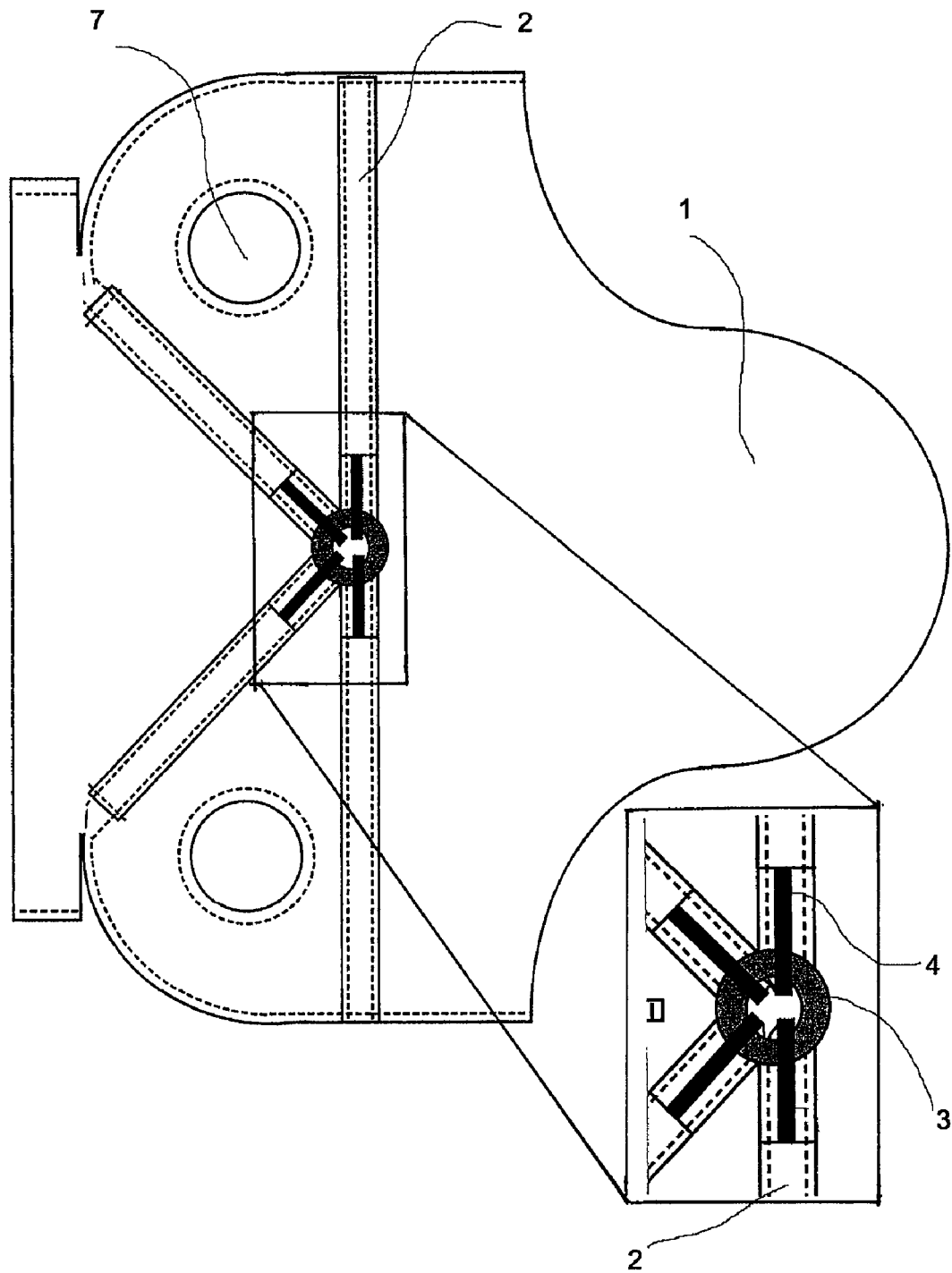
FIG. 2b is a bird's-eye view of the invention if garment was not sewn together, as seen from the underside.
Figure 3:
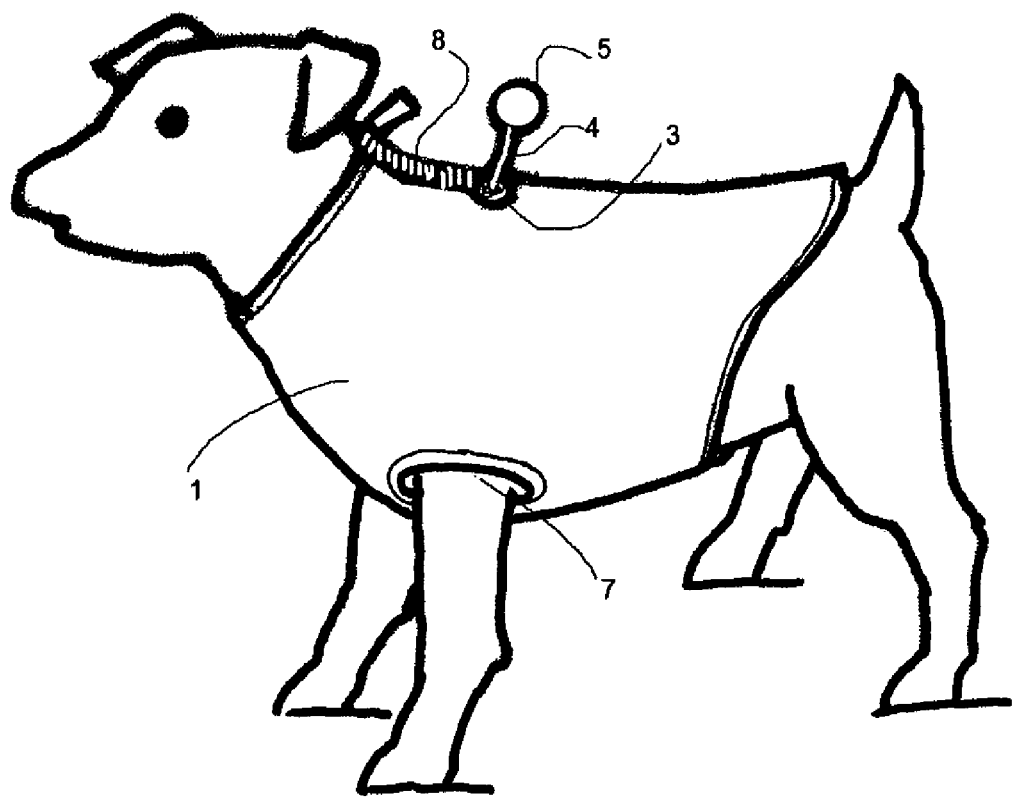
FIG. 3 represents the invention on a dog in a secondary embodiment that includes a zipper at the neck for easier entry.
Figure 4:
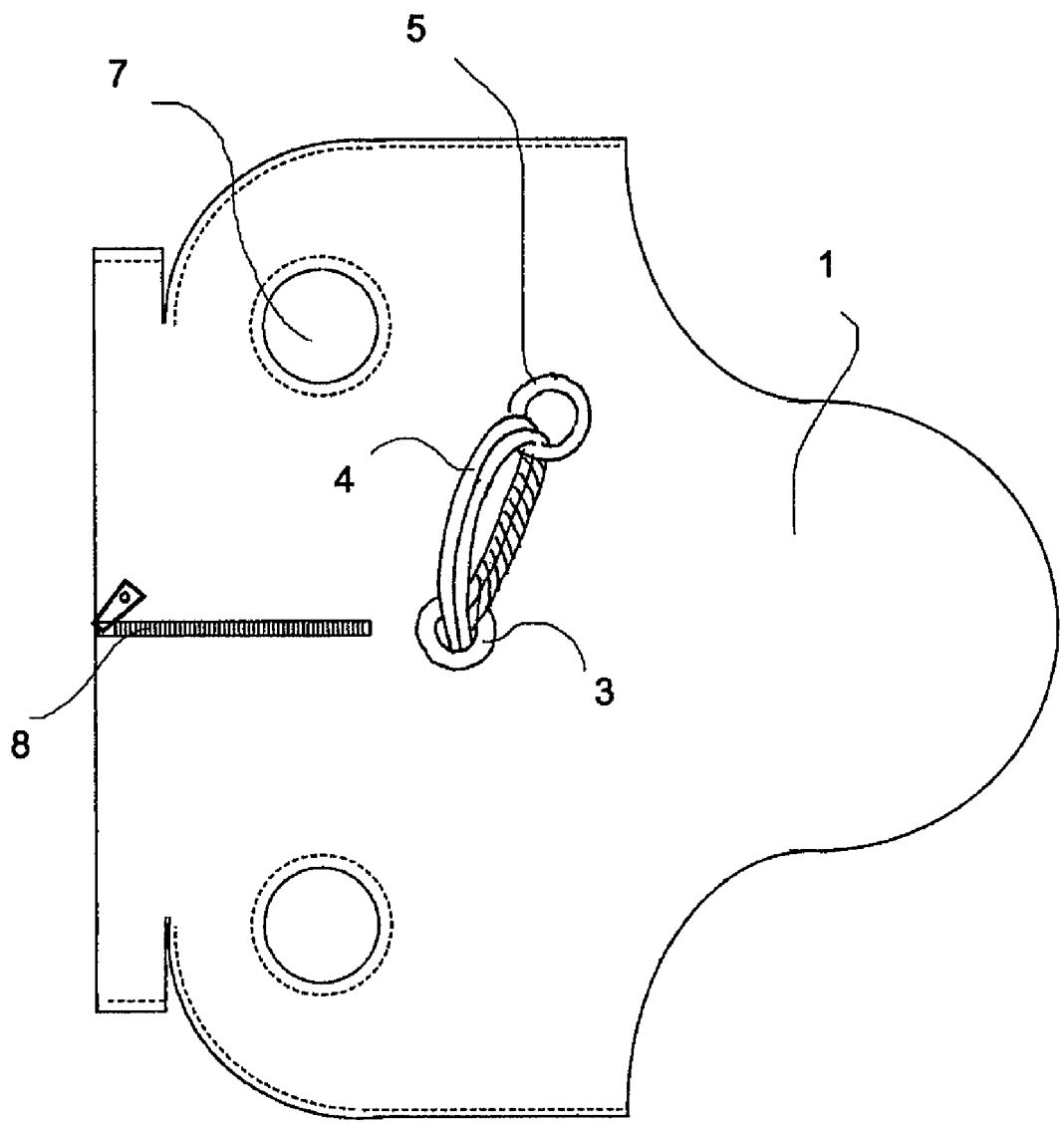
FIG. 4 is a bird's-eye view of the invention if garment was not sewn together, this represents a zippered embodiment.
Figure 5:
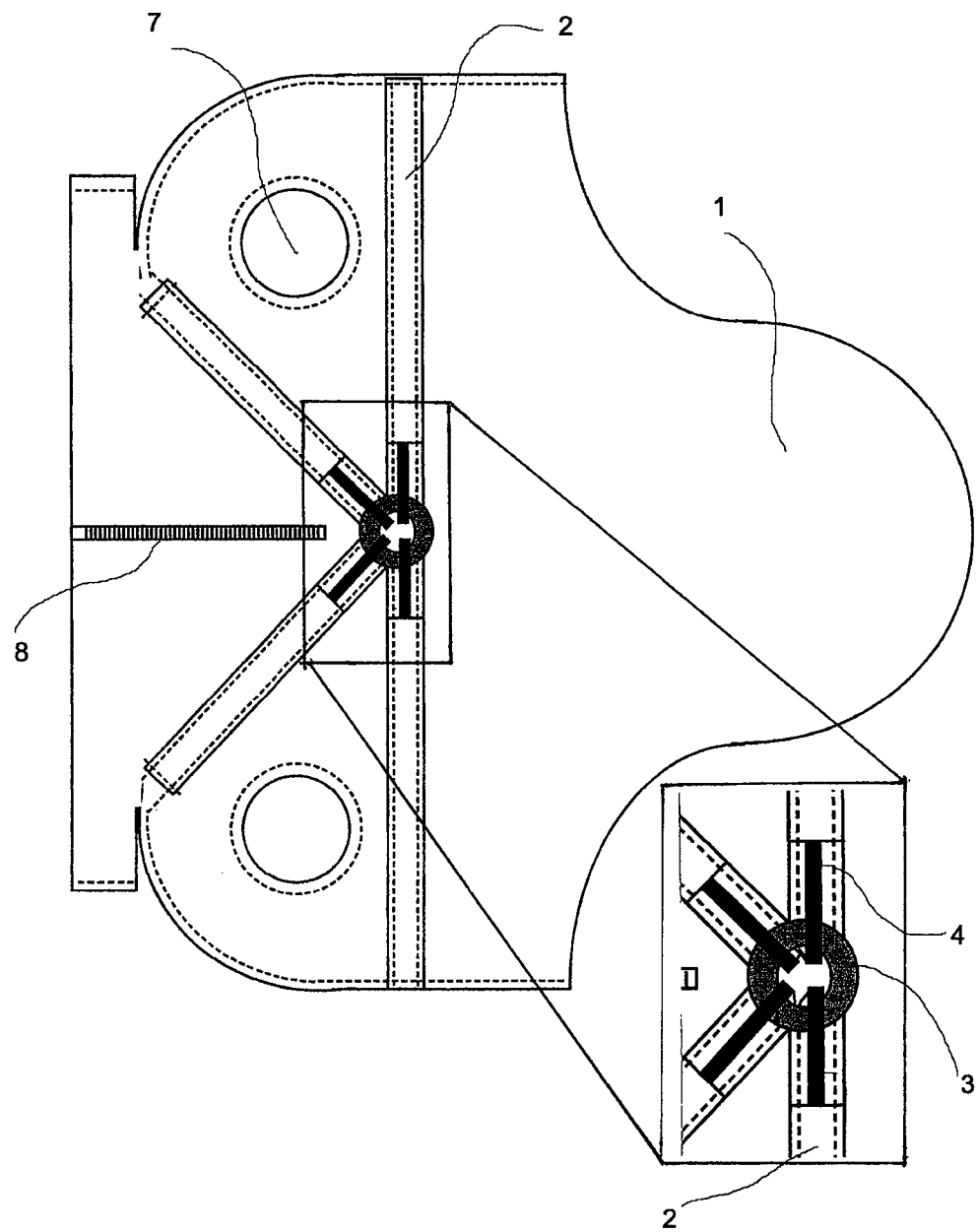
FIG. 5 is a bird's-eye view of the invention if garment was not sewn together, as seen from the underside, in an embodiment that includes a zipper at the neck for easier entry.
Figure 6:
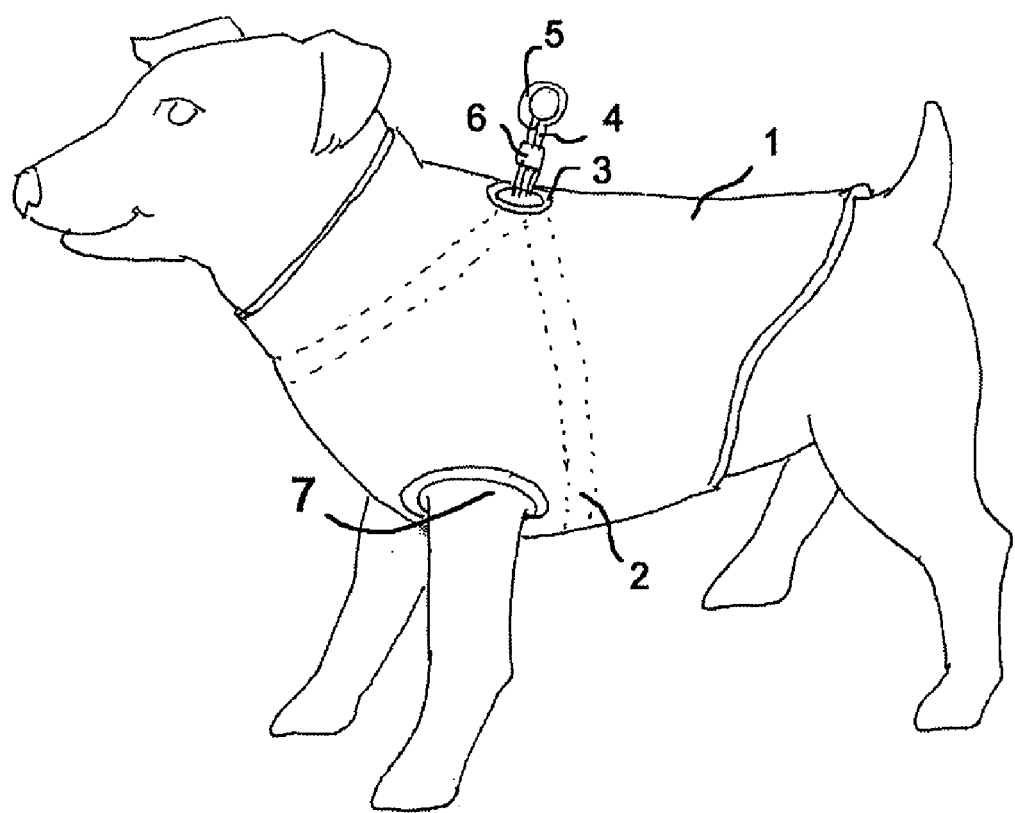
FIG. 6 represents the invention on a dog in a secondary embodiment that includes an adjusting toggle (sometimes called a "cord lock") on the harness for tightening the harness straps.
Figure 7:
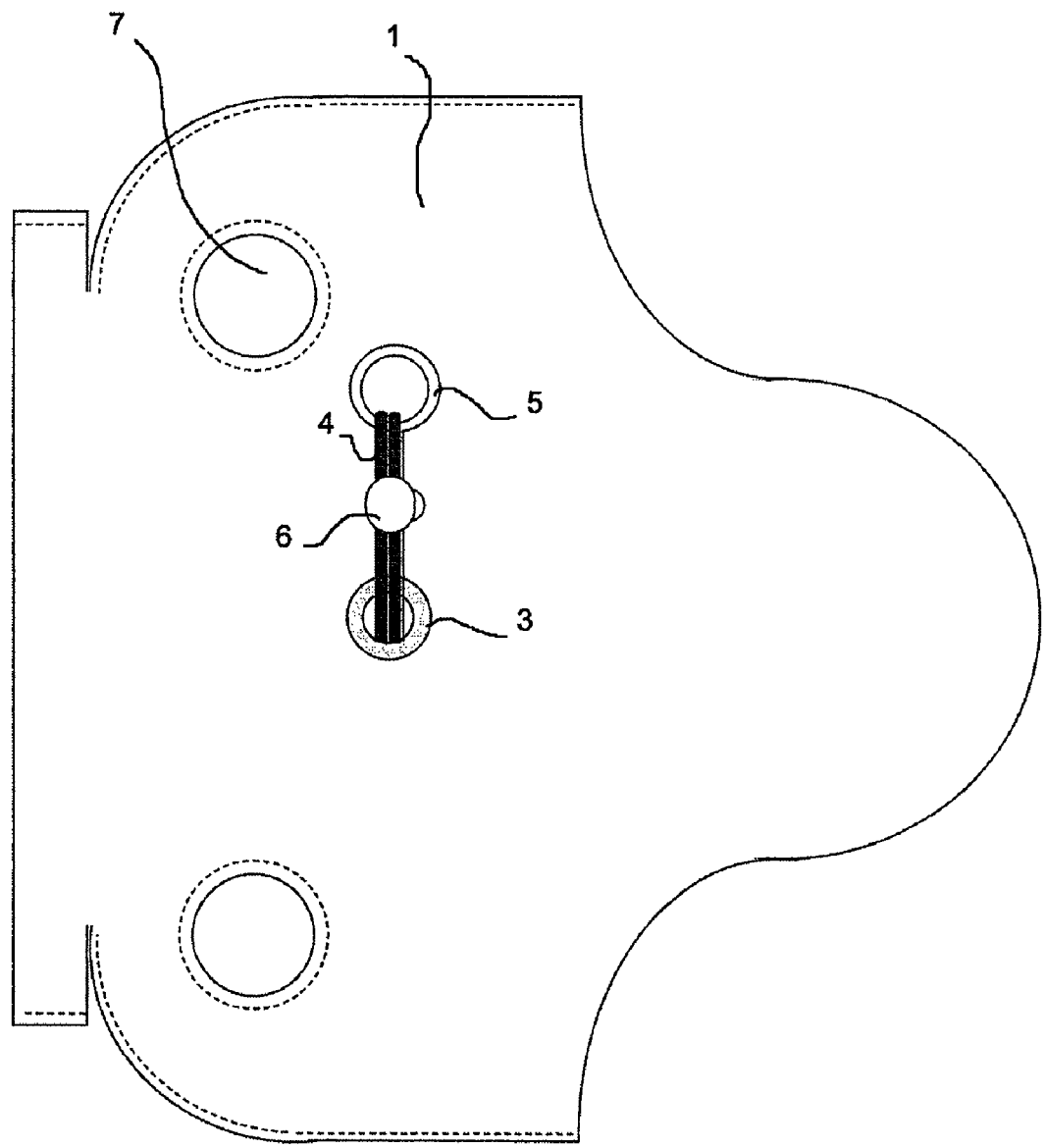
FIG. 7 is a bird's-eye view of the invention if garment was not sewn together in a secondary embodiment that includes an adjusting toggle on the harness for tightening the harness straps.

As seen in FIG. 1, the garment 1 in the current embodiment is a pullover. The garment fits over the animal's neck and front paws. It covers the back, chest and neck leaving the lower abdomen open so as not to interference with an animal's excretory anatomy. Dogs urinating on the underside of the coat is a common complaint amongst dog owners. The unique element in the current art is the built in harness.

The harness material 4 is channeled through a tunnel 2 sewn into the underside of the garment 1. Ideally the material used for the tunnel would have at least some stretch so that it moves with the main body of the garment 1 and to allow the garment to fit over the animal. An embodiment of the present invention may make use of an elastic material. In one embodiment of the present invention, the harness system is comprised of two major elements. The first piece of the harness is channeled across the upper chest in front and above the front legs over the shoulder blades and out through an opening 3. In an embodiment of the present invention, this opening could be in the top along the back behind the neck. The second piece of the harness is channeled under the dog from behind the front legs and out through the aforementioned opening 3 meeting up with the first piece along the pet's back behind the neck. The two harness elements are connected to a leash connector that connects to a leash. This leash connector may be any strong and durable material such as a metal or plastic ring.

The material comprising the main portion of the garment 1 in the preferred embodiment of the current invention may be any textile that provides comfort, protection and some stretch. Some embodiments of the present invention might have warming, elasticity and wind blocking properties. The material should be elastic enough to stretch over the dogs head and front legs. A soft insulating synthetic wool fabric made from PET or other synthetic fibers would work well. This is sometimes called microfleece or simply fleece. Natural wool and cotton would also work, as would rubberized or plastic materials for waterproof embodiments. The harness material 4 may be comprised of any strong organic or man made materials capable of restraining a pet. In a preferred embodiment the harness may be a steel cable, hemp, nylon webbing or similarly strong material.

Figure 8:
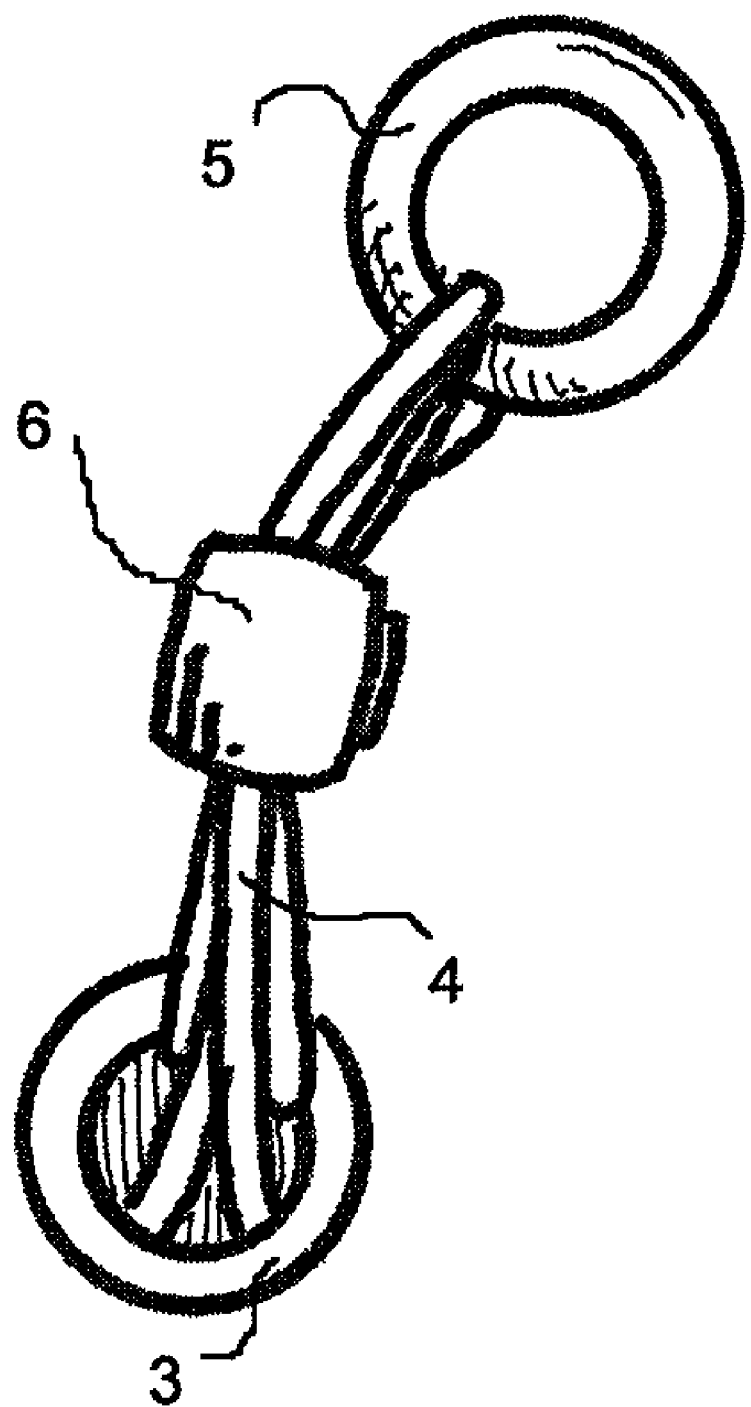
FIG. 8 is a close-up view of the harness assembly with adjusting toggle where it would connect to a leash.

In one embodiment, to put the garment on an animal, the garment is pulled over the animal's head then the right front leg is inserted into the right aperture 7. Then insert the left front leg into the second aperture. The garment can then be straightened on the animal's back. A leash can be clipped onto leash connector 5 on the exposed part of the harness (as seen in FIG. 8).

In an embodiment of the present invention, the harness runs through a spring loaded tightening devise or a toggle (i.e. a cord lock) 6 which can be lowered onto the harness to pull to tighten and secure it to the animal.

In an embodiment of the present invention, the garment may have a zipper 8. In certain embodiments, the zipper may be placed at the back of the neck to release the material and make the garment easier to get on. Further embodiments could have a zipper in places other than the neck.

In certain embodiments, the garment wraps around the animal and is secured to the animal by buttons, hook and loop fasteners, hooks or a zipper.

Although in a preferred embodiment, the harness runs across the chest and under the animal behind the front legs, in another embodiment of the present invention the harness coat could be configured in any pattern that secures the animal. For example, the harness might be configured in an 'X' pattern. 5. In the 'X' pattern, the harness has a first portion which runs over the animal's left shoulder and crosses across the animal's chest and under the animals right leg and a second portion which runs over animal's right shoulder and crosses the animal's chest and then runs under the animal's left front leg, with said first and second portions of the harness meeting at the animal's back.

In certain embodiments the harness is comprised of a single strap. In other embodiments the harness is comprised of two or more straps.

Measurements of the Preferred Embodiment

The main portion 1 of the invention's preferred embodiment is of a stretchable, warm and durable textile such as microfleece. Many different materials would substitute including, but not limited to, natural and manmade wool, neoprene rubber, plastics, hemp and cotton textiles. In addition, alterations may be made to these textiles to add beneficial properties or functions such as water-proofing or stain resistant coatings for example.

Although a plurality of sizes would be available to fit many different size dogs, the size described below would fit an animal of about 5 lbs:

Length from neck to tail ranges from about 5 inches to about 9 inches

Chest circumference ranges from about 10 inches to about 18 inches

Leg Aperture Diameter about 2.5 inches

The size described below would fit an animal of about 7 lbs:

Length from neck to tail ranges from about 8 inches to about 13 inches

Chest circumference ranges from about 16 inches to about 20 inches

Leg Aperture Diameter about 2.5 inches

The size described below would fit an animal of about 12 lbs:

Length from neck to tail ranges from about 11 inches to about 15 inches

Chest circumference ranges from about 18 inches to about 22 inches

Leg Aperture Diameter about 3 inches

The size described below would fit an animal of about 20 lbs:

Length from neck to tail ranges from about 13 inches to about 17 inches

Chest circumference ranges from about 19 inches to about 25 inches

Leg Aperture Diameter about 3.5 inches

The size described below would fit a an animal of about 25 lbs:

Length from neck to tail ranges from about 15 inches to about 20 inches

Chest circumference ranges from about 22 inches to about 28 inches

Leg Aperture Diameter about 4 inches

The size described below would fit an animal of about 30 lbs:

Length from neck to tail ranges from about 17 inches to about 23 inches

Chest circumference ranges from about 24 inches to about 30 inches

Leg Aperture Diameter about 4.5 inches

The size described below would fit an animal of about 50 lbs:

Length from neck to tail ranges from about 19 inches to about 28 inches

Chest circumference ranges from about 28 inches to about 36 inches

Leg Aperture Diameter about 5 inches

The coat of the present invention may be produced in a plurality of sizes including breed specific sizes to accommodate breeds such as Bulldogs which are broad and short or Dachshunds being narrow and long. Although it may be produced to accommodate the extremes of specific breeds, the preferred embodiment would have a ratio of chest circumference to length of approximately 2:1.

It is understood that the foregoing description merely illustrates the invention and that modification such as width, length and stylistic revisions may be made within the scope of the appended claims. For example, to suit specific breeds, coats with different ratios of width to length may be manufactured.

I claim:

1. A protective garment for domesticated animals which incorporates a built-in harness comprising:
    a garment capable of covering an animal's back, chest and neck, leaving the lower abdomen uncovered;
    a harness which is built in to the garment;
    a leash connector for connecting the harness to a leash, wherein the harness does not have fasteners other than the leash connector.

2. The protective garment of claim 1, wherein the leash connector is selected from the group consisting of a metal ring a 'D' ring, a plastic ring and a durable strap.

3. The protective garment of claim 1, wherein the harness has a first portion which runs across the animal's lower chest above its front legs and a second portion which runs under the animal behind the front legs, with said first and second portions meeting together on the animal's back behind the neck.

4. The protective garment of claim 3, wherein said first portion of the harness and said second portion of the harness are two separate straps which meet together on the animal's back.

5. The protective garment of claim 1 wherein the harness has a first portion which runs over the animal's left shoulder and crosses across the animal's chest and under the animal's right leg and a second portion which runs over the animal's right shoulder and crosses the animal's chest and then runs under the animal's left front leg, with said first and second portions of the harness meeting at the animal's back.

6. The protective garment of claim 1, wherein the domesticated animal is a canine.

7. The protective garment of claim 6, wherein the adjusting toggle is located where harness attaches to leash.

8. The protective garment of claim 1, wherein the built in harness is hidden from view when the animal is wearing the garment.

9. The protective garment of claim 1, wherein the garment contains a zipper at the neck.

10. The protective garment of claim 1, wherein the garment wraps around the animal and is secured to the animal by buttons, hook and loop fasteners, hooks or a zipper.

11. The protective garment of claim 1, wherein the harness has an adjusting toggle for tightening the harness straps.

12. The protective garment of claim 1, wherein the harness is made of material selected from group consisting of nylon, cotton, hemp and metal.

13. The protective garment of claim 12, wherein the harness is made of metal and the metal is steel.

14. The protective garment of claim 1, wherein the harness is channeled through tunnels sewn into the garment.

15. The protective garment of claim 1, wherein the garment material has elasticity, such that it can be pulled over the animal's head and front legs.

16. The protective garment of claim 1, wherein the garment material has wind blocking properties.

17. The protective garment of claim 1, wherein the garment material is selected from the group consisting of a synthetic fiber, wool, cotton, a rubberized material, a plastic material, neoprene, rubber and hemp.

18. The protective garment of claim 1, wherein the garment material is water proof.

19. The protective garment of claim 1, wherein the garment is treated to be stain resistant.

20. The protective garment of claim 1, wherein the garment has a ratio of chest circumference to length of about 2:1.

21. The protective garment of claim 1, wherein the garment is capable of fitting a dog of about 5 lbs and has a length from neck to tail of from about 5 inches to about 9 inches, a chest circumference ranges of from about 10 inches to about 18 inches and a leg aperture diameter of about 2.5 inches.

22. The protective garment of claim 1, wherein the garment is capable of fitting a dog of about 7 lbs and has a length from neck to tail of from about 8 inches to about 13 inches, a chest circumference of from about 16 inches to about 20 inches and a leg aperture diameter of about 2.5 inches.

23. The protective garment of claim 1, wherein the garment is capable of fitting a dog of about 12 lbs and has a length from neck to tail of about 11 inches to about 15 inches, a chest circumference of from about 18 inches to about 22 inches and a leg aperture diameter of about 3 inches.

24. The protective garment of claim 1, wherein the garment is capable of fitting a dog of about 20 lbs and has a length from neck to tail of from about 13 inches to about 17 inches, a chest circumference of from about 19 inches to about 25 inches and a leg aperture diameter of about 3.5 inches.

25. The protective garment of claim 1, wherein the garment is capable of fitting a dog of about 25 lbs and has a length from neck to tail of from about 15 inches to about 20 inches, a chest circumference of from about 22 inches to about 28 inches and a leg aperture diameter of about 4 inches.

26. The protective garment of claim 1, wherein the garment is capable of fitting a dog of about 50 lbs and has a length from neck to tail from about 19 inches to about 28 inches, a chest circumference of from about 28 inches to about 36 inches and a leg aperture diameter of about 5 inches.

\* \* \* \* \*